United States Patent
Mithal et al.

(10) Patent No.: US 10,630,554 B1
(45) Date of Patent: Apr. 21, 2020

(54) INPUT/OUTPUT (I/O) PERFORMANCE OF HOSTS THROUGH BI-DIRECTIONAL BANDWIDTH FEEDBACK OPTIMIZATION

(71) Applicant: INTERNATIONAL BUSINESS MACHINES CORPORATION, Armonk, NY (US)

(72) Inventors: Akshat Mithal, Pune (IN); Subhojit Roy, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/174,109

(22) Filed: Oct. 29, 2018

(51) Int. Cl.
| | |
|---|---|
| G06F 9/50 | (2006.01) |
| H04L 12/26 | (2006.01) |
| H04L 12/931 | (2013.01) |
| G06F 9/455 | (2018.01) |
| H04L 12/24 | (2006.01) |
| H04L 29/08 | (2006.01) |

(52) U.S. Cl.
CPC .......... H04L 41/0896 (2013.01); H04L 67/10 (2013.01)

(58) Field of Classification Search
CPC ............... H04L 29/08144; H04L 29/06; H04L 29/08072; H04L 29/08171; H04L 12/5695; H04L 49/35; H04L 41/0896; H04L 41/142; H04L 43/0894; H04L 43/16; G06F 9/45558; G06F 9/5005; G06F 9/5077; G06F 2009/45595
See application file for complete search history.

(56) References Cited

U.S. PATENT DOCUMENTS

| | | | |
|---|---|---|---|
| 2013/0179636 A1 | 7/2013 | Shirasu et al. | |
| 2013/0254767 A1 | 9/2013 | Mizuno et al. | |
| 2015/0188821 A1* | 7/2015 | Campbell | H04L 47/12 370/237 |
| 2015/0263987 A1* | 9/2015 | Klein | H04L 29/08 709/226 |
| 2015/0312126 A1* | 10/2015 | Deshpande | H04L 43/0894 709/216 |
| 2015/0381496 A1* | 12/2015 | Minato | H04L 41/0803 370/230 |
| 2016/0217104 A1* | 7/2016 | Kamble | G06F 15/167 |
| 2016/0337272 A1* | 11/2016 | Berman | H04L 49/70 |
| 2016/0373337 A1* | 12/2016 | DeCusatis | H04L 45/14 |
| 2017/0155599 A1 | 6/2017 | Vobbilisetty et al. | |
| 2017/0245185 A1* | 8/2017 | Chuberre | H04B 7/15507 |
| 2018/0145926 A1 | 5/2018 | Armstrong et al. | |
| 2018/0357109 A1* | 12/2018 | Mithal | G06F 9/5077 |
| 2018/0365044 A1* | 12/2018 | Movsisyan | H04L 41/0816 |
| 2019/0028536 A1* | 1/2019 | Chauhan | H04L 69/16 |

(Continued)

*Primary Examiner* — Abdullahi E Salad
(74) *Attorney, Agent, or Firm* — Griffiths & Seaton PLLC

(57) ABSTRACT

Embodiments for improving Input/Output (I/O) performance through bi-directional bandwidth feedback optimization in a distributed computing environment. Resource allocation information from a host is retrieved by an application plugin. Bandwidth allocation information is retrieved from a network switch using Enhanced Transmission Selection (ETS) by the application plugin. A bandwidth optimization operation is performed on the host and/or on the network switch according to the resource allocation information received from the host and the bandwidth allocation information received from the network switch by the application plugin.

18 Claims, 10 Drawing Sheets

(56) References Cited

U.S. PATENT DOCUMENTS

2019/0089640 A1\* 3/2019 To .................. H04L 47/2441
2019/0147086 A1\* 5/2019 Pal .................. G06F 16/2425
                                                707/718

\* cited by examiner

US 10,630,554 B1

INPUT/OUTPUT (I/O) PERFORMANCE OF HOSTS THROUGH BI-DIRECTIONAL BANDWIDTH FEEDBACK OPTIMIZATION

BACKGROUND OF THE INVENTION

Field of the Invention

The present invention relates in general computing systems, and more particularly to, various embodiments for optimizing resource and bandwidth usage within and/or between distributed computing components.

Description of the Related Art

In today's society, computer systems are commonplace. Computer systems may be found in the workplace, at home, or at school. As computer systems become increasingly relied upon, convenient, and portable, the Internet has grown exponentially. Now, more than ever before, individuals and businesses rely upon distributed storage systems (commonly referred to as "the cloud") to store information and data. As wide strides in technological advancement relating to data access devices have been accomplished, there is an ever-growing demand for growth and development within the back end supporting systems that provide and store the data content.

SUMMARY OF THE INVENTION

Various embodiments are disclosed herein for improving Input/Output (I/O) performance through bi-directional bandwidth feedback optimization, by a processor. In one embodiment, by way of example only, a method comprises retrieving resource allocation information from a host by an application plugin; retrieving bandwidth allocation information from a network switch using Enhanced Transmission Selection (ETS) by the application plugin; and performing a bandwidth optimization operation on at least one of the host and the network switch according to the resource allocation information received from the host and the bandwidth allocation information received from the network switch by the application plugin.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
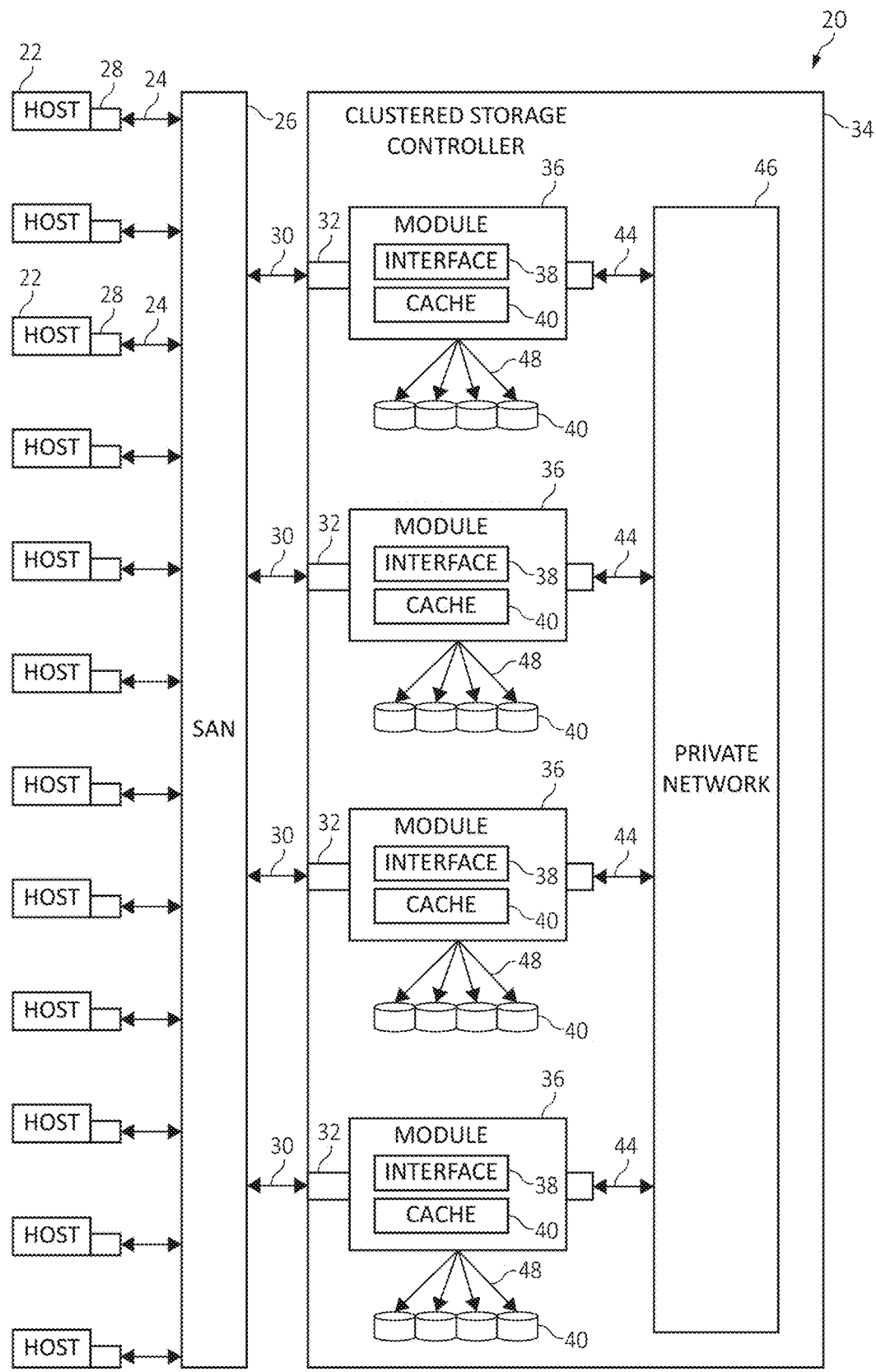
FIG. 1 is a block diagram of a computer storage environment, according to embodiments of the present invention.

Ethernet networks are typically employed in local area networks (LANs) that include a plurality of network switches. A number of communication protocols have been developed and continue to evolve to enhance Ethernet network performance for various environments. For example, an enhancement to Ethernet, called data center bridging (DCB), converged enhanced Ethernet (CEE) or data center Ethernet (DCE), supports the convergence of LANs with storage area networks (SANs). Other protocols that can be used in a data center environment in conjunction with Ethernet include, for instance, Fibre Channel over Ethernet (FCoE), Internet Wide Area Remote Memory Access Protocol (iWARP), Remote Direct Memory Access over Converged Ethernet (RoCE), and Internet Small Computer Systems Interface (iSCSI) connections.

In traditional network architectures, there is no centralized network control. Routing tables located locally in network devices, such as switches, bridges, gateways, routers, or firewalls, are individually configured to direct network traffic to neighboring nodes of the network. The network devices may make control decisions and forward network traffic accordingly. In software-defined networking (SDN), network traffic routing decisions are centrally controlled and made by a controller that creates tables to define flow paths through the network. The controller decouples control decisions about where traffic is sent from network devices that forward traffic to a selected destination.

In some SDN architectures, networking hardware, such as network switches, may implement Data Center Bridging Capability Exchange protocol (DCBX) functionality. DCBX comprises a discovery and exchange protocol for communicating configuration and parameter information among neighboring nodes to ensure a consistent configuration of each device across the data center network. Enhanced Transmission Selection (ETS) is a Quality of Service (QoS) feature implemented via DCBX in switches. With ETS, bandwidth can be allocated to different network traffic classes (e.g., FCoE and iSCSI protocols) when both types of traffic are handled by the same switch.

Consider now a scenario of a datacenter having a hypervisor hosting two guest virtual machines (VM1 and VM2), where VM1 handles FCoE I/O traffic and VM2 handles iSCSI I/O traffic through a network switch that supports ETS. Consider also that the switch has bandwidth allocation specified at 50% for FCoE traffic and 50% for iSCSI traffic, and both the VM's are handling an amount of I/O such that each of their respective 50% bandwidth quota is completely consumed.

At this point, even were Central Processing Unit (CPU), Random Access Memory (RAM) and network resources of one of the VMs increased, with the goal of enabling the VM to drive more Input/Output Operations per Second (IOPs) and bandwidth, the network switch is not made aware of this allocation; and hence an increase in resources at the VM-level cannot be utilized to drive higher I/O rates through the switch at times of congestion.

Similarly, when CPU allocation for one (or each) VM is reduced, the switch is unaware that this VM is not capable of utilizing the entire bandwidth allocated to its traffic class; and hence the switch prevents other traffic classes from consuming the available additional bandwidth for other traffic classes at times of congestion.

In short, there is a disconnect between resource allocation information on the server (to drive higher I/O throughput/performance) vs bandwidth allocation information at the switch(es) (to adjust QoS parameters according to the desired capability at the server-level). This gap must be bridged in order to prevent unbalanced allocation of resources at server and network levels.

In another scenario, in datacenters where a large number of servers are connected to the same network switch such that only 10% of the servers are using one protocol (e.g., FCoE) and the remaining 90% are connected via another protocol (e.g., iSCSI)—if the network switch is maintaining a bandwidth allocation for FCoE and iSCSI as 50% each, in times of congestion, there is a high likelihood that this would be an inappropriate allocation because iSCSI usage would most likely be much higher than the 10% of servers using FCoE. This would cause large latencies to iSCSI servers, and there exists no mechanism within the switch to know that this gap exists.

In yet another scenario, if the bandwidth allocation is set by the ETS functionality within the switch in such a way that a particular protocol consistently uses more than the defined bandwidth allocation, the switch is again unaware of this imbalance and has no monitoring mechanism to make decisions on how to more appropriately balance the I/O traffic.

In still another scenario, if the bandwidth is inappropriately allocated such that it, even in times of congestion, it never reaches to the maximum threshold set by ETS, then there is no mechanism used by switch to create a warning indicating that bandwidth allocations may need to be adjusted nor even monitoring to detect that such a problem exists.

Accordingly, the present invention considers various embodiments to improve virtual and physical machine I/O performance by using dynamic bandwidth optimization of ETS enabled switches according to a bidirectional feedback mechanism. These mechanisms include such functionality as using an application plugin to retrieve resource allocation and bandwidth information from both the hosts (e.g., physical machines or a hypervisor hosting VM(s)) and the ETS enabled network switch, compare the information to determine whether the resource allocation information of the host is commensurate with the bandwidth allocation information of the network switch, and perform one of a plurality of resource/bandwidth optimization operations on the hosts and/or on the network switch to increase the I/O throughput thereof. This functionality creates an awareness between the hosts and the network switch(es) of I/O traffic exchanged therebetween to better optimize both host resources and switch resources, while serving applications demanding high IOPs to be served well with reduced latency. Further, a reverse feedback mechanism is created whereby an administrator of a physical machine/hypervisor hosting a VM (or automatically via the hardware itself) may make more accurate decisions as to what resources should be dedicated to certain I/O traffic within that server according to information received from the networking equipment such as to better optimize usage of those resources within the server.

As will be discussed, in some embodiments, the resource/bandwidth optimization operation may comprise providing a suggestion to the network switch to adjust the bandwidth allocation of a particular class (protocol) of I/O traffic based upon resource allocation information received from the host which is dedicated to that class of I/O traffic. In other embodiments, the resource/bandwidth optimization operation may comprise providing a suggestion to the host(s) to adjust the resource allocations dedicated to the particular class of I/O traffic based upon the bandwidth allocation information received from the network switch which is dedicated to the same. In yet other embodiments, the resource/bandwidth optimization operation may comprise monitoring the network switch to determine whether a peak bandwidth usage used by the particular class of I/O traffic is consistently above or below its allocated threshold, and create a warning to the network switch to adjust the bandwidth allocation for the particular class of I/O traffic accordingly. In still other embodiments, the bandwidth allocation at the network switch may be adjusted according to a frequency count of a number of pause frames and an overall amount of the particular class of I/O traffic. These and additional aspects of the present invention and attendant benefits will be further described, following.

It should be noted that the instant disclosure, for brevity, frequents the language of "resources". In an actual implementation of the present invention, the resources termed herein may be comprised of CPUs, graphical processing units (GPUs), memory, storage devices, network devices, accelerator devices, or even entire computing nodes. Indeed, any hardware and/or software resources as commonly known in the art are to be construed interchangeably with "resources" or "resource types" as described herein, as one practicing the art would appreciate.

Turning now to FIG. 1, a schematic pictorial illustration of a data processing storage subsystem 20 is shown, in accordance with a disclosed embodiment of the invention.

The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a network switch. Herein, by way of example, HBAs 28 may be coupled to storage modules 36 by at least one switch (not shown in FIG. 1) of SAN 26, which can be of any known type having a digital cross-connect function. Additionally, or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
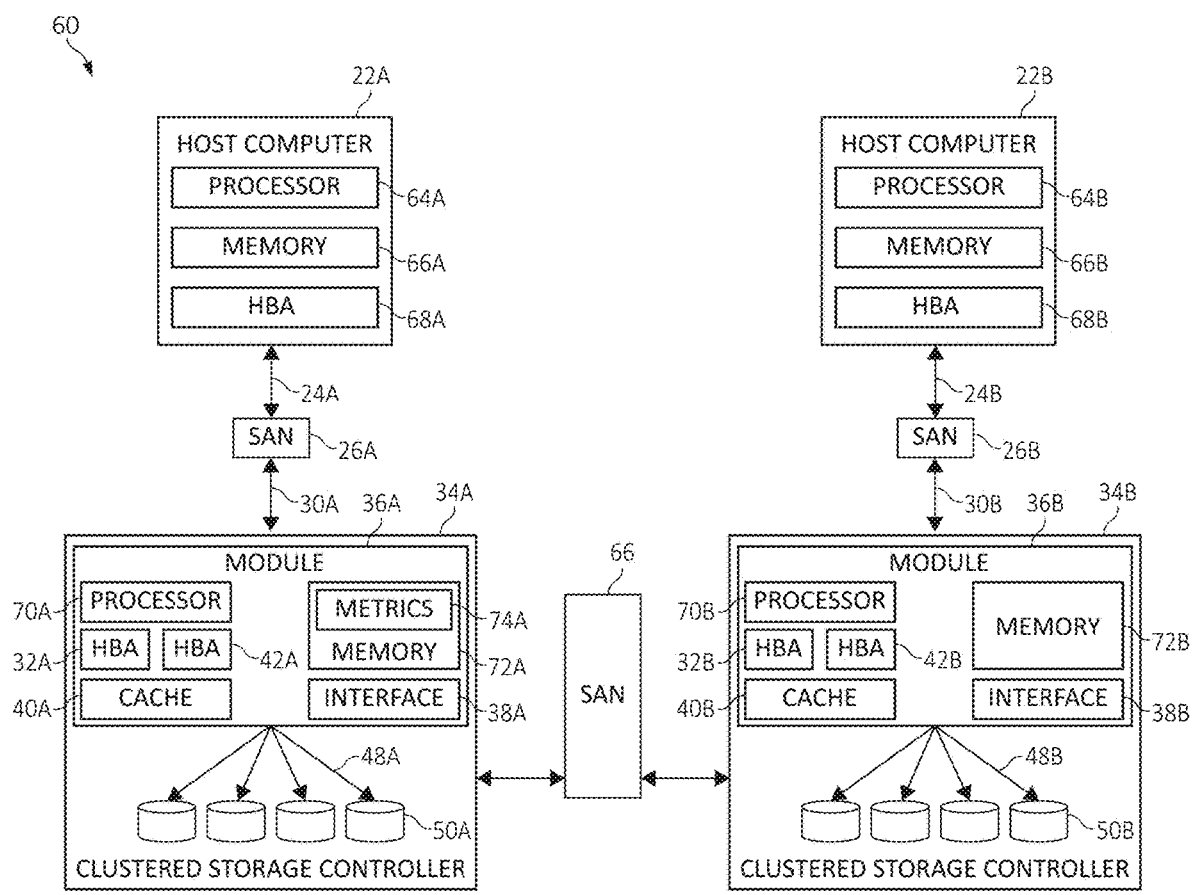
FIG. 2 is a block diagram of a hardware structure of a data storage system, according to embodiments of the present invention.

FIG. 2 is a schematic pictorial illustration of facility 100 configured to perform host computer monitoring, in accordance with an embodiment of the present invention. In the description herein, host computers 22, storage controllers 34 and their respective components may be differentiated by appending a letter to the identifying numeral, so that facility 100 comprises a first host computer 22A (also referred to herein as a primary host computer) coupled to a clustered storage controller 34A via a SAN 26A, and a second host computer 22B (also referred to herein as a secondary host computer) coupled to a clustered storage controller 34B via a SAN 26B. In the configuration shown in FIG. 2 storage controllers 34A and 34B are coupled via a facility SAN 102. In other embodiments, as will be described herein, the first host computer 22A may be directly connected to the clustered storage controller 34B, and the second host computer 22B may be directly connected to the clustered storage controller 34A via a SAN similar to SAN 102, a virtualized networking connection, or any other computer implemented medium.

Host computer 22A comprises a processor 64A, a memory 66A, and an adapter 68A. Adapter 68A is coupled to SAN 26A via a data connection 24A.

As described supra, module 36A is coupled to storage devices 50A via data connections 48A, and comprises adapters 32A and 42A, a cache 40A, and an interface 38A. Module 36A also comprises a processor 70A and a memory 72A. As explained in detail hereinbelow, processor 70A is configured to establish metrics 114 that indicate a connectivity status of host computer 22A, and store the metrics to memory 72A. In some embodiments, processor 70A may store metrics 74 to storage devices 50A.

Host computer 22B comprises a processor 64B, a memory 66B, and an adapter 68B. Adapter 68B is coupled to SAN 26B via a data connection 24B.

As described supra, module 36B is coupled to storage devices 50B via data connections 48B, and comprises adapters 32B and 42B, a cache 40B, and an interface 38B. Module 36B also comprises a processor 70A and a memory 72B.

Processors 64A, 64B, 70A and 70B typically comprise general-purpose computers, which are programmed in software to carry out the functions described herein. The software may be downloaded to host computers 22A and 22B and modules 36A and 36B in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Examples of adapters 32A, 32B, 42A, 42B, 68A and 68B, include switched fabric adapters such as Fibre Channel (FC) adapters, iSCSI adapters, FCoE adapters and Infiniband™ adapters.

While the configuration shown in FIG. 2 shows storage host computers 22A and 22B coupled to storage controllers 34A and 34B via SANs 26A and 26B, other configurations are to be considered within the spirit and scope of the present invention. For example, host computers 22A and 22B can be coupled to a single storage controller 34 via a single SAN 26.

It is further understood in advance that although this disclosure includes a detailed description on cloud computing, following, that implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes and storage systems (e.g. storage subsystem 20).

Figure 3:
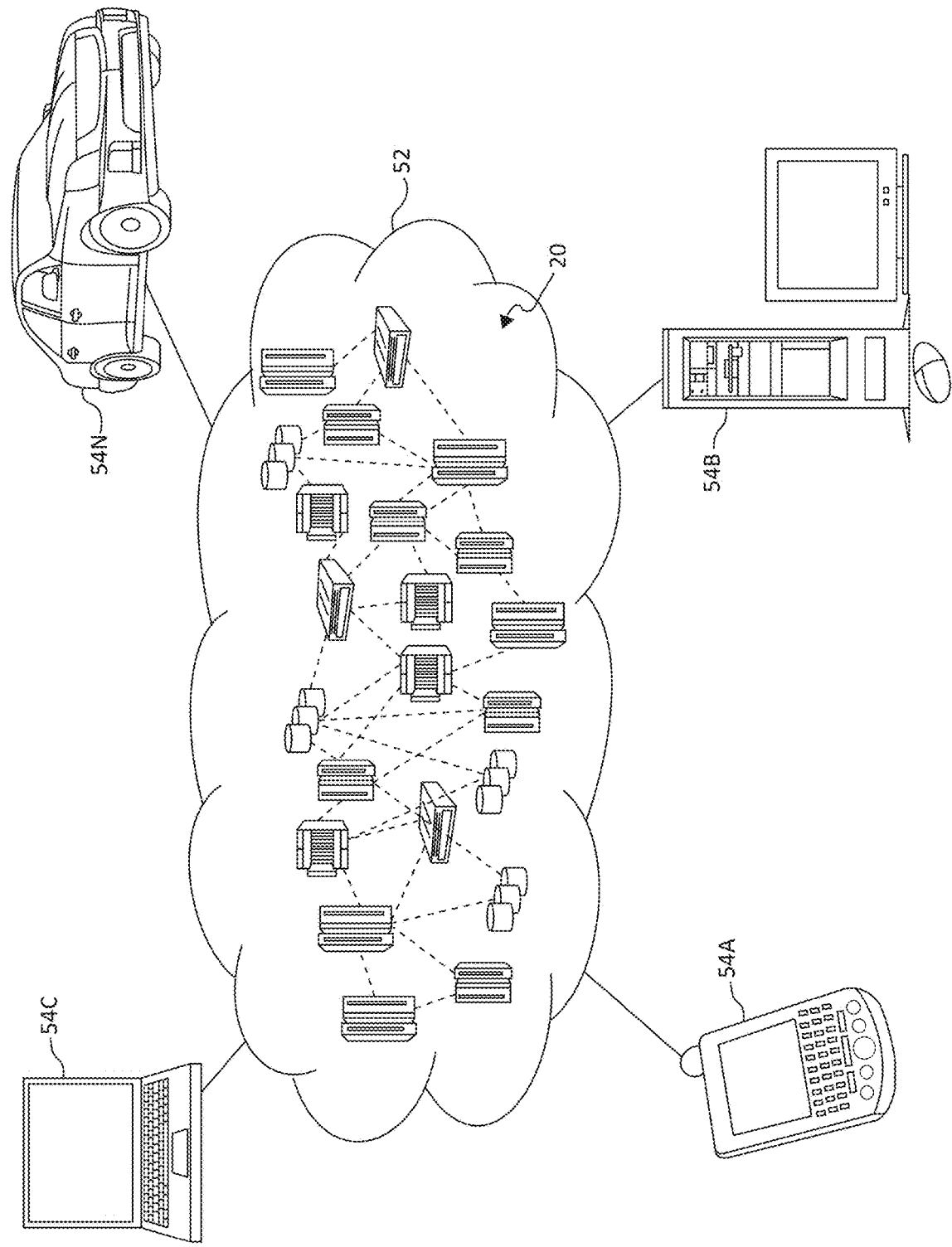
FIG. 3 is a block diagram of an exemplary cloud computing environment, according to embodiments of the present invention.

Referring now to FIG. 3, illustrative cloud computing environment 52 is depicted. As shown, cloud computing environment 52 comprises one or more storage subsystems 20 and cloud computing nodes with which local computing devices used by cloud consumers, such as, for example, personal digital assistant (PDA) or cellular telephone 54A, desktop computer 54B, laptop computer 54C, and/or automobile computer system 54N may communicate. Storage systems 20 and the cloud nodes may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 3 are intended to be illustrative only and that storage subsystems 20, cloud computing nodes and cloud computing environment 52 can communicate with any type of computerized device over any type of network and/or network addressable connection (e.g., using a web browser).

Figure 4:
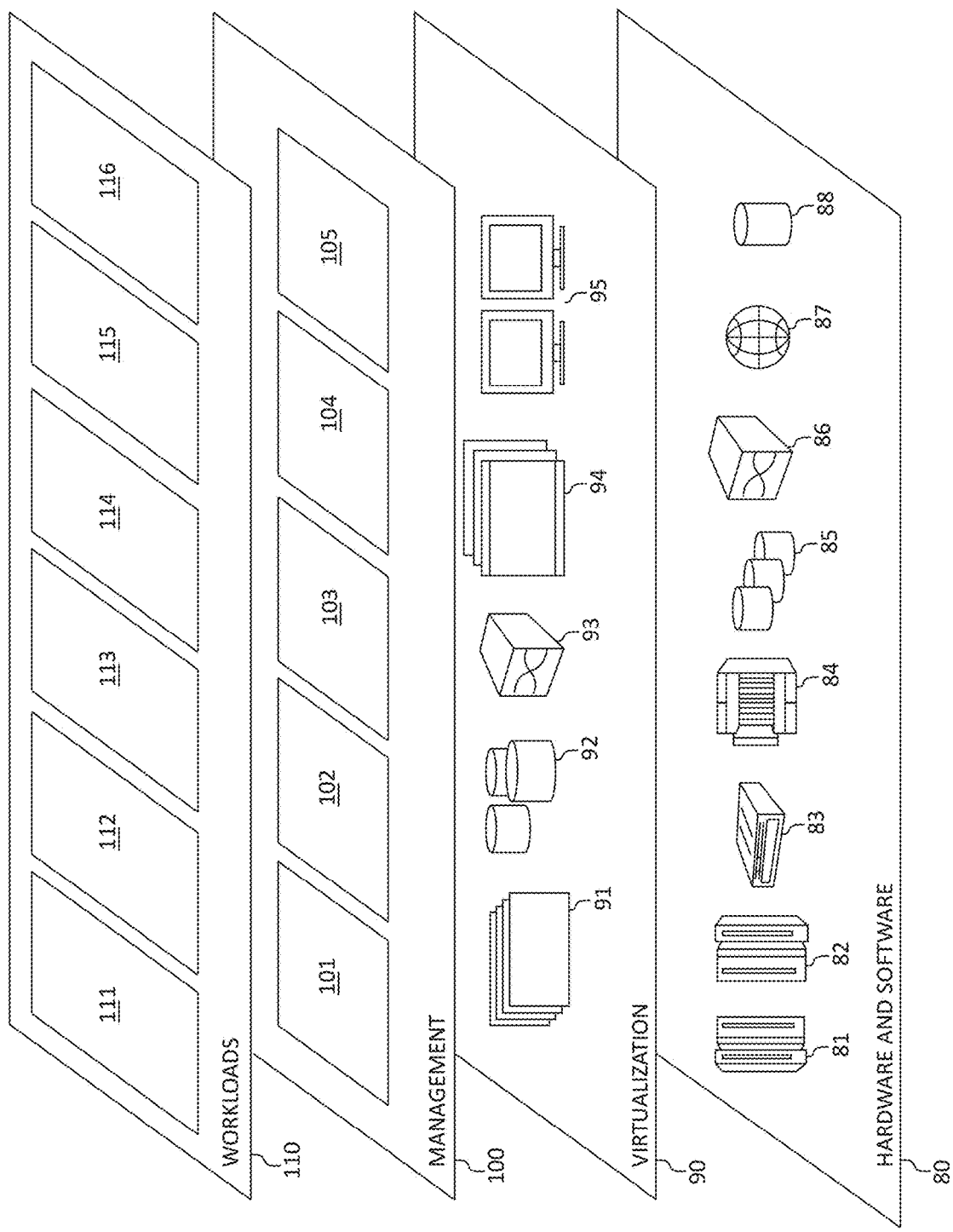
FIG. 4 is a block diagram depicting abstraction model layers, according to embodiments of the present invention.

Referring now to FIG. 4, a set of functional abstraction layers provided by cloud computing environment 52 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 80 includes hardware and software components. Examples of hardware components include: mainframes 81; RISC (Reduced Instruction Set Computer) architecture based servers 82; servers 83; blade servers 84; storage devices 85; and networks and networking components 86. In some embodiments, software components include network application server software 87 and database software 88.

Virtualization layer 90 provides an abstraction layer from which the following examples of virtual entities may be provided: virtual servers 91; virtual storage 92; virtual networks 93, including virtual private networks; virtual applications and operating systems 94; and virtual clients 95.

In one example, management layer 100 may provide the functions described below. Resource provisioning 101 provides dynamic procurement of computing resources and other resources that are utilized to perform tasks within the cloud computing environment. Metering and Pricing 102 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 103 provides access to the cloud computing environment for consumers and system administrators. Service level management 104 provides cloud computing resource allocation and management such that required service levels are met. Service Level Agreement (SLA) planning and fulfillment 105 provide pre-arrangement for, and procurement of, cloud computing resources for which a future requirement is anticipated in accordance with an SLA.

Workloads layer 110 provides examples of functionality for which the cloud computing environment may be utilized. Examples of workloads and functions which may be provided from this layer include: mapping and navigation 111; software development and lifecycle management 112; virtual classroom education delivery 113; data analytics processing 114; transaction processing 115; and, in the context of the illustrated embodiments of the present invention, various network analytical and resource allocation functions 116. One of ordinary skill in the art will appreciate that the network analytical and resource allocation functions 116 may also work in conjunction with other portions of the various abstractions layers, such as those in hardware and software 80, virtualization 90, management 100, and other workloads 110 (such as data analytics processing 114, for example) to accomplish the various purposes of the illustrated embodiments of the present invention.

Bi-Directional Bandwidth and Resource Feedback Optimization

Figure 5A:
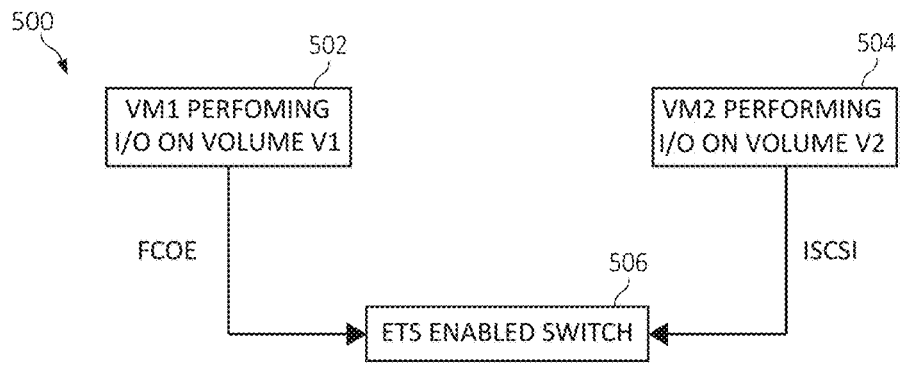
FIG. 5A is a block diagram of a network switch implementing Enhanced Transmission Selection (ETS) functionality, according to embodiments of the present invention.

As aforementioned, some network switches have the capability to support the ETS feature, which allocates bandwidth within the switch for different classes of service (i.e., using different protocols). ETS ensures a minimum bandwidth is guaranteed (as per the allocation) for that particular class of service. FIG. 5A is a block diagram of a network architecture 500 implementing ETS functionality. Architecture 500 depicts VM1 (block 502) communicating with an ETS-enabled network switch 506 through a FCoE protocol and VM2 (block 504) communicating with the network switch 506 through an iSCSI protocol. The ETS feature reserves a bandwidth allocation for each class of I/O traffic from both protocols (e.g., 50% bandwidth for FCoE and 50% bandwidth for iSCSI) within the same switch resource. However, currently, ETS currently does not take into account modifications in resource allocations occurring on the host side (i.e., resource allocation modifications within either VM1 502 or VM2 504), and only relies on a switch administrator to modify policies or allocation thereof.

For example, there could be changes occurring at the VM resource allocation-level such that VM CPU, RAM and network resource shares are increased for driving more I/O through the VM, however due to bandwidth constraints on the ETS-enabled switch, the switch is unable to produce higher throughput rates due to a bottleneck in its allocation for a particular class of I/O traffic. In such a case, feedback from the hypervisor (or physical host) indicating such a change in resource allocation may allow the switch to intelligently increase or decrease its bandwidth allocation for the specific protocol which the host is using for performing these I/O operations.

TABLE 1

| Virtual Machine Name | Protocol I/O and BW allocation in switch | Resource allocated originally in % (CPU/RAM/Network) | New Resource allocation in % (CPU/RAM/Network) | Suggestion to Switch by Plug-in to change BW allocation |
|---|---|---|---|---|
| VM1 | FCoE, 50% | 10 | 80 | FCoE, 80% |
| VM2 | iSCSI, 50% | 20 | 20 | iSCSI, 20% |

Thus, if the switch has bandwidth allocation performed by ETS such that, one of the used protocols is allocated bandwidth which is defined to an amount much lesser than what it consistently uses in times of congestion, the switch may use a monitoring agent comprising an application plugin to monitor this imbalance between the VM and the switch, and create a suggestion to the administrator (or automatically without user input) to increase the bandwidth allocation to improve on latencies for I/O traffic using this protocol. Referring back to network architecture 500 and to Table 1, upon an additional resource allocation in VM1 502 (such as additional CPU, RAM, and/or networking resources, etc. being provisioned to the VM), a suggestion may be created and transmitted to the switch 506 to re-allocate additional bandwidth to the FCoE protocol (the protocol of I/O VM1 502 is using). In Table 1, an example is shown at which the switch 506 is splitting bandwidth between FCoE and iSCSI protocols at 50% each. Accordingly, when VM1 502 is allocated an additional 80% of resources (which percentage may be granularly defined per individual resource and/or aggregately defined over a sum of all resources of the VM), the suggestion to the switch 506 is to re-allocate 80% of its bandwidth to FCoE and 20% of its bandwidth to iSCSI (the protocol VM2 504 is using, which resources were originally defined lower at 20%).

Similarly, there may be scenarios of bandwidth allocation where ETS allocates bandwidth to a particular protocol in the switch 506, which even in times of congestion, never reaches the defined allocation threshold. In such cases, the monitoring agent/application plugin (which may be implemented within the switch 506 or within a given host/VM) may monitor the traffic of the particular protocol over a period of time and create a suggestion to reduce the bandwidth allocation to this class of I/O traffic within the switch 506.

Notably, if the switch 506 maintains a bandwidth allocation, such that, in spite of increasing VM resources at the hypervisor-level, the switch 506 is unable to increase allocation for the protocol further (and therefore the switch 506 will become a bottleneck), the switch 506 may provide feedback to the hypervisor of the VM (via the plug-in) to reduce VM resources of CPU, RAM, network shares, etc. Here, increased allocation of resources of the host or VM is not justified, as the switch 506 is unable to provide any further throughput, and by means of feedback these resources of the given VM/physical host would optimized.

Figure 5B:
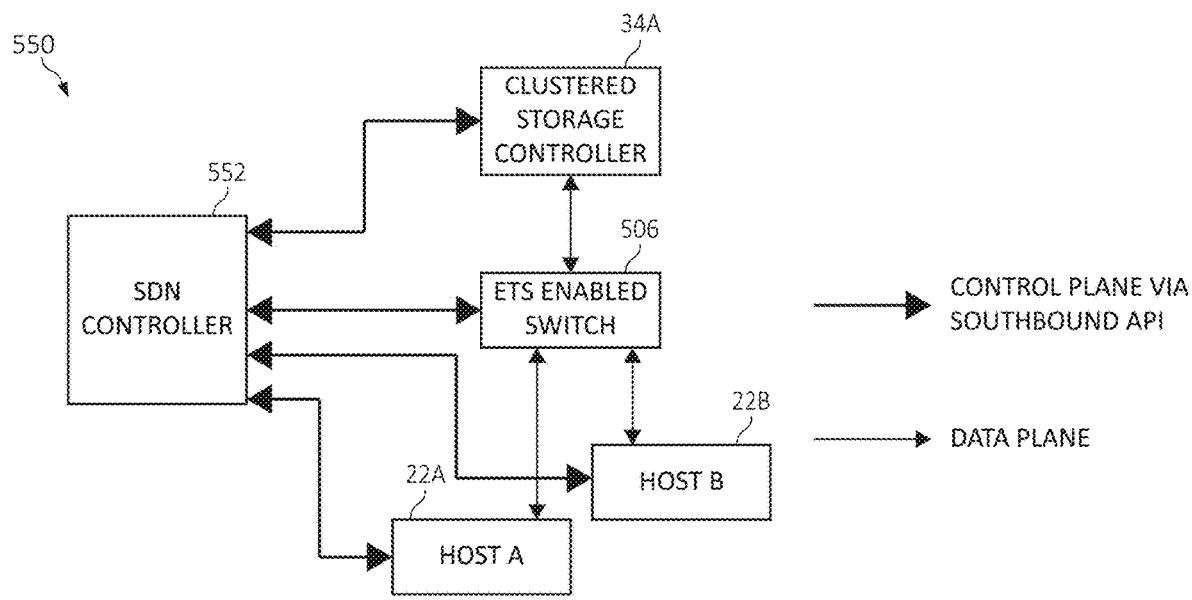
FIG. 5B is a block diagram of a Software Defined Network (SDN) architecture, according to embodiments of the present invention.

It should be also be noted that the present disclosure is applicable not only to traditional SAN environments but also to Software Defined Networking (SDN) configurations, as described in the network architecture 550 in FIG. 5B. Architecture 550 illustrates an SDN configuration having an SDN controller 552 controlling given hosts 22A and 22B, switch 506, and clustered storage controller 34A. Architecture 550 includes a control plane and a data plane, where control plane communication is achieved via a southbound Application Programming Interface (API), or any other medium, to fetch data from various network devices to make an intelligent decisions as to the alteration of bandwidth allocations used by various protocols in the switch 506. Communication between various network entities (i.e., clustered storage controller 34A, hosts 22A and 22B, and the switch 506) is achieved via the data plane.

Figure 6:
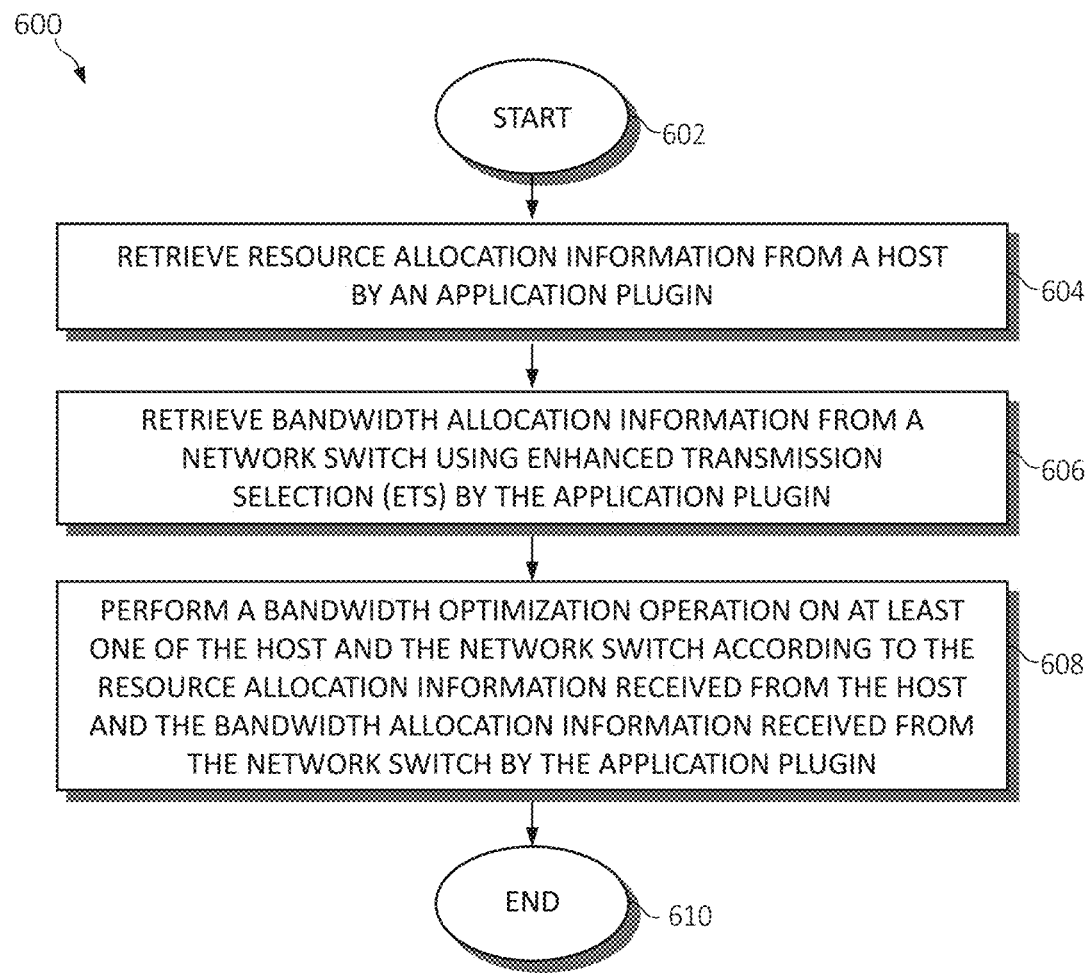
FIG. 6 is a flow chart diagram illustrating an exemplary method for improving Input/Output (I/O) performance through bi-directional bandwidth feedback optimization, according to embodiments of the present invention.

Turning now, to FIG. 6, FIG. 6 illustrates this functionality by describing an exemplary method 600 for an exemplary method for improving I/O performance through bi-directional bandwidth feedback optimization, in accordance with one embodiment of the present invention. The method 600 (and any subsequent methods) may be performed in accordance with the present invention in any of the environments depicted in FIGS. 1-5B, among others, in various embodiments. Of course, more or less operations than those specifically described in FIG. 6 may be included in method 600, as would be understood by one of skill in the art upon reading the present descriptions.

Each of the steps of the method 600 (and any subsequent methods) may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a CPU, an application specific integrated circuit (ASIC), a field programmable gate array (FPGA), etc., combinations thereof, or any other suitable computing device known in the art.

The method 600 begins (step 602) by retrieving resource allocation information from a host by an application plugin (step 604). Bandwidth allocation information is retrieved from a network switch using ETS by the application plugin (step 606). A bandwidth optimization operation is performed on at least one of the host and the network switch according to the resource allocation information received from the host and the bandwidth allocation information received from the network switch by the application plugin (step 608). The method 600 ends (step 610).

Figure 7A:
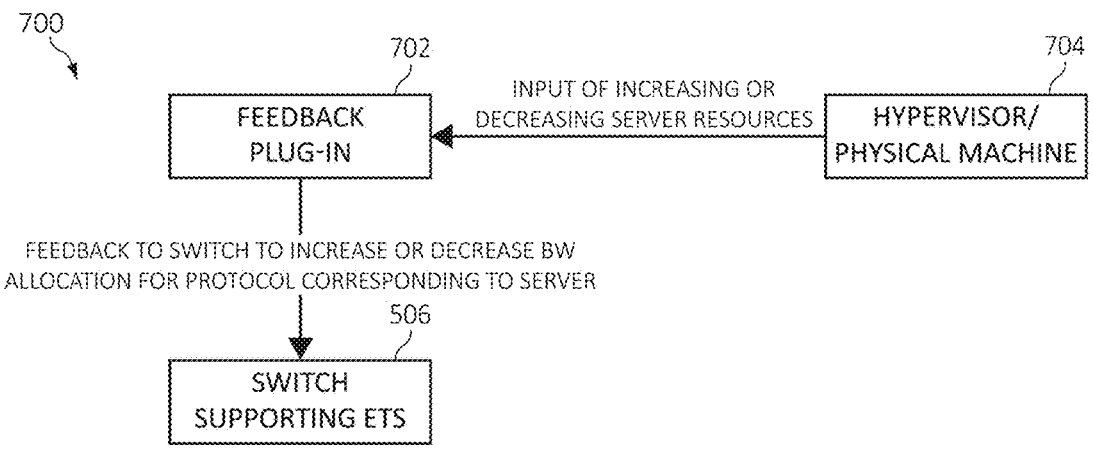
FIG. 7A is a block diagram of functional components for improving I/O performance through bi-directional bandwidth feedback optimization, according to embodiments of the present invention.
Figure 7B:
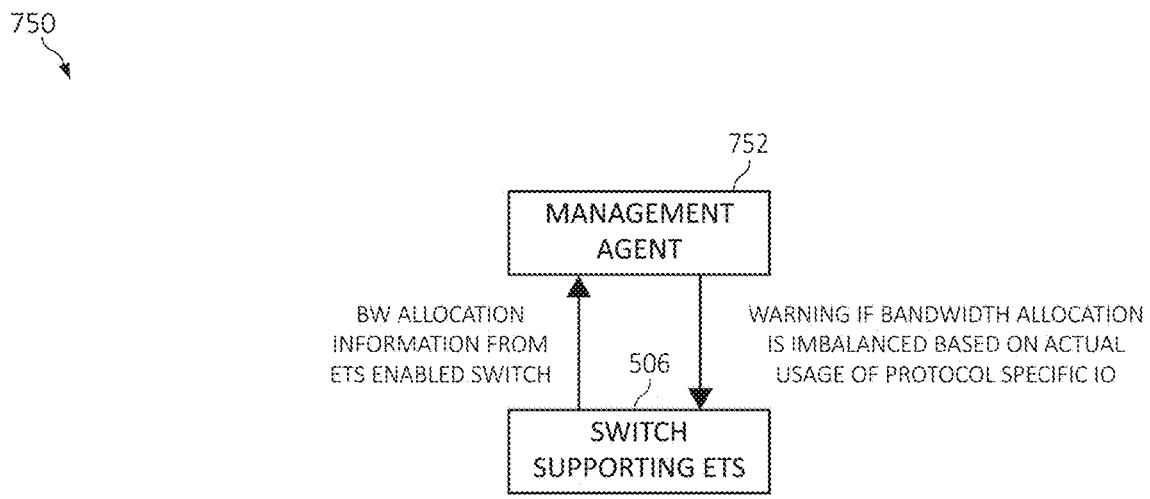
FIG. 7B is an additional block diagram of functional components for improving I/O performance through bi-directional bandwidth feedback optimization, according to embodiments of the present invention.

Continuing, FIGS. 7A and 7B are a block diagrams depicting exemplary functional components 700 and 750, respectively, according to various mechanisms of the illustrated embodiments, is shown. As shown, the various functionality, or "modules" of functionality, hardware devices, and/or other components in the same descriptive sense as has been previously described in FIGS. 1-5B may be included in FIGS. 7A and 7B.

Beginning with functional components 700, an application plugin 702 receives feedback from a hypervisor or physical machine 704 regarding the increase or decrease of resource allocations allotted thereto. The application plugin uses this information to then provide feedback to the switch 506 to commensurately increase or decrease bandwidth allocation for I/O traffic of the protocol used by the hypervisor or physical machine 704. Functional components 750 then illustrate a management agent 752 which monitors the switch 506 to detect whether the current bandwidth allocations of each protocol used by the switch 506 are consistently (i.e., over a predefined timeframe) underutilizing or overutilizing their allocated bandwidth. If so, the management agent 752 creates a warning to the switch 506 that the bandwidth allocation is imbalanced based upon the actual usage of the protocol-specific I/O traffic. It should again be noted that the switch 506 may pass this warning indication on to an administrator who then may re-allocate bandwidth to certain protocol classes within the ETS, or the warning indication may be received and implemented by the switch 506 such that the switch 506 automatically re-allocates and re-balances the bandwidth between the protocol classes without user input.

Figure 8:
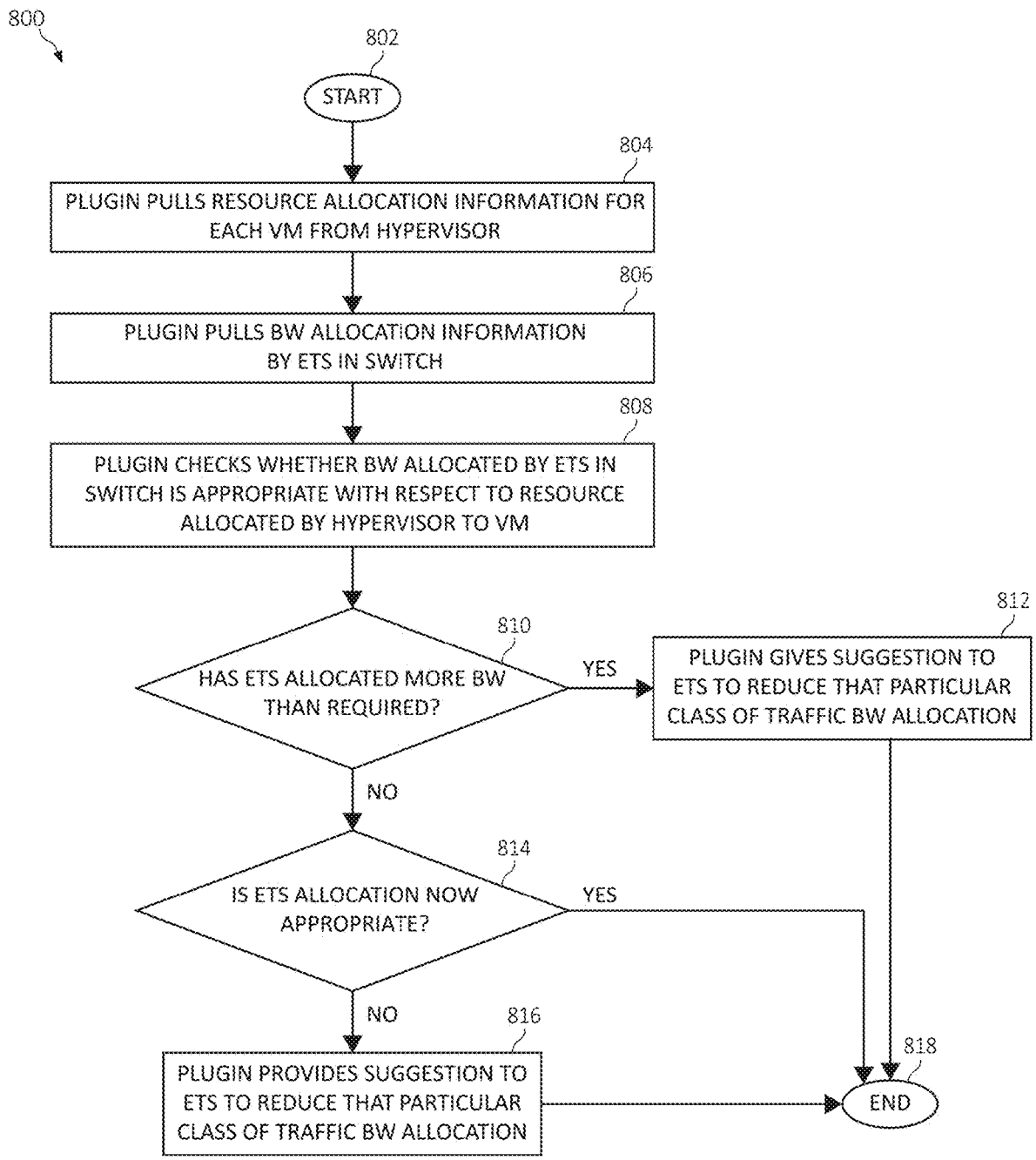
FIG. 8 is an additional flow chart diagram illustrating an exemplary method for improving I/O performance through bi-directional bandwidth feedback optimization, according to embodiments of the present invention.

Turning now to FIG. 8, an additional flow chart diagram illustrating an exemplary method 800 for improving I/O performance through bi-directional bandwidth feedback optimization is illustrated. It should be appreciated that, although the functionality described in the method 800 is illustrated in the context of a hypervisor/VM environment, the same functionality may apply to operating systems of physical hosts. The method 800 begins (step 802) by using the application plugin to pull (retrieve) resource allocation information for each VM from the hypervisor (step 804). The application plugin then pulls bandwidth allocation information from ETS in the switch 506 (step 806). The application plugin then monitors whether the bandwidth allocated by ETS in the switch 506 is appropriate (commensurate) with respect to the resources allocated by the hypervisor to each VM (step 808). At step 810, a determination is made whether ETS in the switch 506 has allocated more bandwidth than required for the particular class of I/O traffic according to the allocated resources of the VM (which are dedicated to that particular class of I/O traffic). If, at step 810 it is determined ETS in the switch 506 has allocated more bandwidth than required for the particular class of I/O traffic, the application plugin transmits a suggestion (to the administrator) and/or an instruction (to the operating software) to ETS of the switch 506 to reduce the bandwidth allocation for the particular class of I/O traffic (step 812); and the method 800 ends (step 818).

Returning to step 810, if it is determined ETS in the switch 506 does not have allocated more bandwidth than required for the particular class of I/O traffic, a determination is then made at step 814 as to whether the bandwidth allocation in ETS is currently balanced and/or less than required for the particular class of I/O traffic. If, at step 814, the bandwidth allocation in ETS is balanced for both the particular class of I/O traffic and for the currently allocated resources of the VM, the method 800 ends (step 818). Returning to step 814, if the bandwidth allocation within the ETS of the switch 506 continues to be imbalanced or is less than required with regard to both the class of I/O traffic and the resources allocated to the VM, the application plugin transmits a suggestion/instruction to ETS of the switch 506 to increase bandwidth for that particular class of I/O traffic (step 816), and the method 800 ends (step 818).

Figure 9:
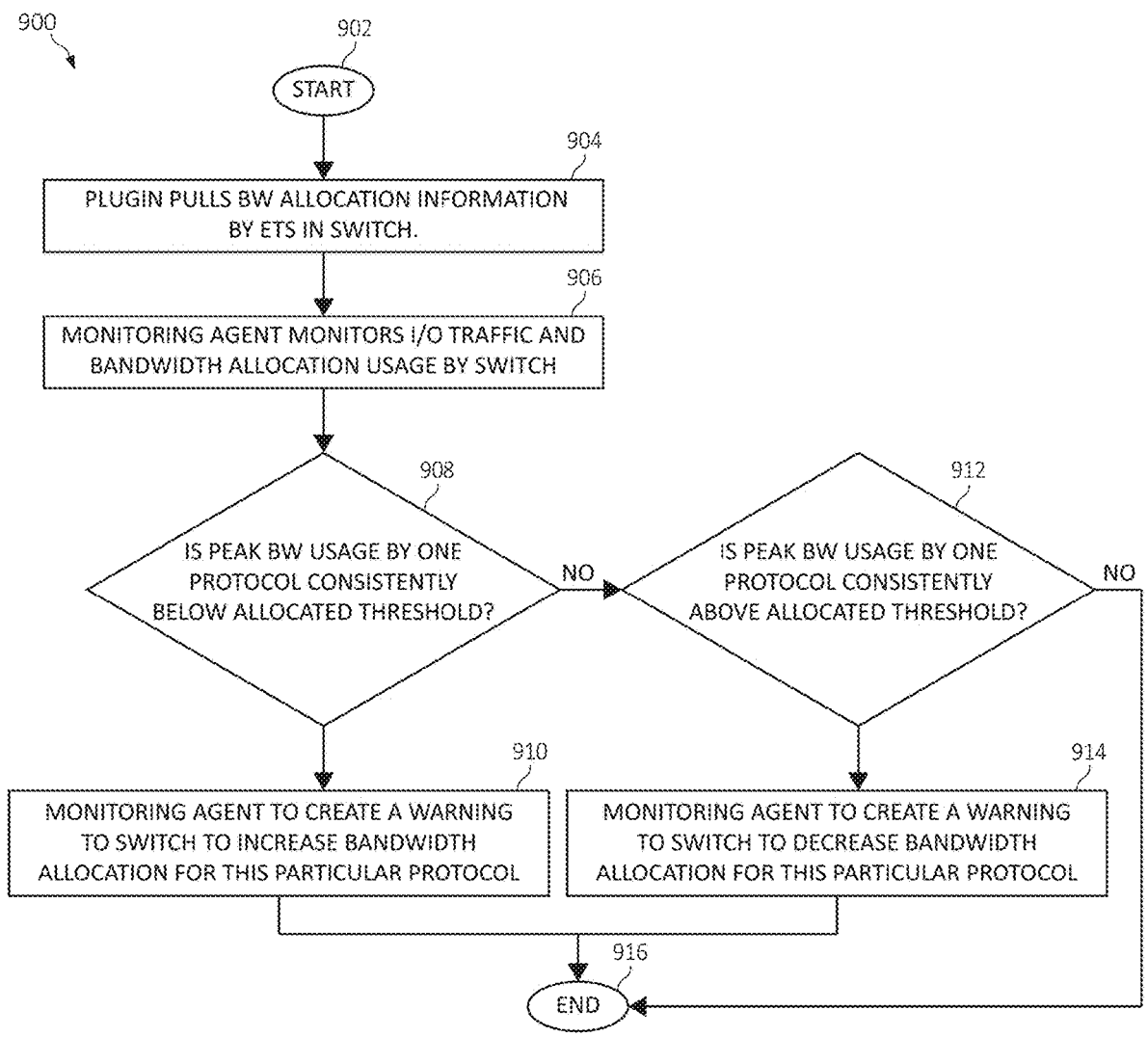
FIG. 9 is an additional flow chart diagram illustrating an exemplary method for improving I/O performance through bi-directional bandwidth feedback optimization, according to embodiments of the present invention.

FIG. 9 illustrates an additional flow chart diagram of an exemplary method 900 for improving I/O performance through bi-directional bandwidth feedback optimization. The method 900 begins (step 902) by using the application plugin to pull bandwidth allocation information by ETS in the switch 506 (step 904). A monitoring agent then monitors I/O traffic throughput and the current bandwidth allocations of each class (protocol) usage per switch 506 (step 906). A determination is then made at step 908 as to whether a peak bandwidth usage by one particular class of I/O traffic consistently (i.e., at a certain time of day, for a predetermined timeframe, and/or as expressed as a percentage over a predetermined timeframe) below the allocated bandwidth threshold for the particular class of I/O traffic. If the peak bandwidth usage of one particular class of I/O traffic is consistently below the allocated bandwidth threshold set by ETS in the switch 506, the monitoring agent creates a warning/indication to the switch 506 to increase bandwidth allocation for this particular class (protocol) of I/O traffic (step 910), and the method 900 ends (step 916).

Returning to step 908, if the peak bandwidth usage of the particular class of I/O traffic is not consistently below the allocated bandwidth threshold set by ETS in the switch 506, another determination is made at step 912 as to whether the peak bandwidth usage of the particular class of I/O traffic is consistently above the allocated bandwidth threshold set by ETS in the switch 506. If at step 912, the peak usage of the particular class of I/O traffic is not consistently above the allocated bandwidth threshold, the method 900 ends (step 916). Returning to step 912, if the peak usage of the particular class of I/O traffic is consistently above the allocated bandwidth threshold, the monitoring agent creates a warning/indication to the switch 506 to decrease bandwidth allocation for this particular class of I/O traffic (step 914); and the method 900 ends (step 916).

Figure 10:
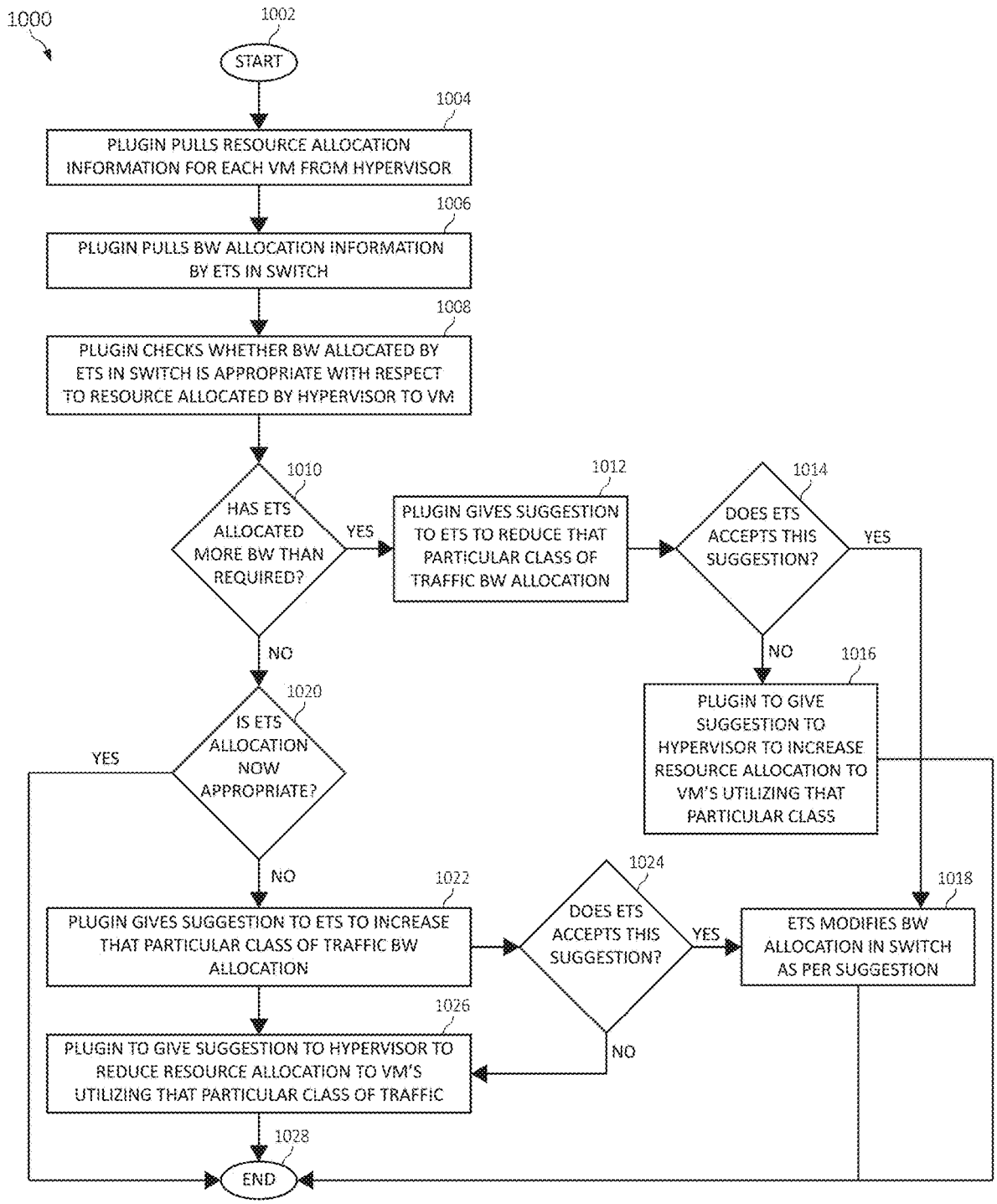
FIG. 10 is still an additional flow chart diagram illustrating an exemplary method for improving I/O performance through bi-directional bandwidth feedback optimization, according to embodiments of the present invention.

FIG. 10 illustrates still an additional flow chart diagram of an exemplary method 1000 for improving I/O performance through bi-directional bandwidth feedback optimization. The method 1000 begins (step 1002) by using the application plugin to pull (retrieve) resource allocation information for each VM from the hypervisor (step 1004). The application plugin then pulls bandwidth allocation information from ETS in the switch 506 (step 1006). The application plugin then monitors whether the bandwidth allocated by ETS in the switch 506 is appropriate (commensurate) with respect to the resources allocated by the hypervisor to each VM (step 1008). At step 1010, a determination is made whether ETS in the switch 506 has allocated more bandwidth than required for the particular class of I/O traffic according to the allocated resources of the VM (which are dedicated to that particular class of I/O traffic). If, at step 1010 it is determined ETS in the switch 506 has allocated more bandwidth than required for the particular class of I/O traffic, the application plugin transmits a suggestion (to the administrator) and/or an instruction (to the operating software) to ETS of the switch 506 to reduce the bandwidth allocation for the particular class of I/O traffic (step 1012). The method 1000 then continues by determining whether the ETS of the switch 506 accepts this suggestion to alter the bandwidth allocation (step 1014). If the ETS accepts the suggestion at step 1014, the ETS then modifies the bandwidth allocation for the particular class of I/O traffic in the switch 506 as suggested by the application plugin (step 1018), and the method 1000 ends (step 1028). If, at step 1014, the ETS provides a negative indication and does not accept the suggestion to modify the bandwidth allocation and/or is unable to do so, the application plugin provides a suggestion to the hypervisor hosting the VM to increase resources to the VM utilizing the particular class of I/O traffic through an increased resource allocation operation (step 1016); and the method 1000 ends (step 1028). Again, this indication to modify resources of the VM may be indicated to an administrator and/or automatically applied by the hypervisor as suggested by the application plugin with no user input.

Returning to step 1010, if it is determined ETS in the switch 506 does not have allocated more bandwidth than required for the particular class of I/O traffic, a determination is then made at step 1020 as to whether the bandwidth allocation in ETS is currently balanced and/or less than required for the particular class of I/O traffic. If, at step 1020, the bandwidth allocation in ETS is balanced for both the particular class of I/O traffic and for the currently allocated resources of the VM, the method 1000 ends (step 1028). Returning to step 1020, if the bandwidth allocation within the ETS of the switch 506 continues to be imbalanced or is less than required with regard to both the class of I/O traffic and the resources allocated to the VM, the application plugin transmits a suggestion/instruction to ETS of the switch 506 to increase bandwidth for that particular class of I/O traffic (step 1022).

The method 1000 then continues by determining whether the ETS of the switch 506 accepts this suggestion to alter the bandwidth allocation (step 1024). If the ETS accepts the suggestion at step 1024, the ETS then modifies the bandwidth allocation for the particular class of I/O traffic in the switch 506 as suggested by the application plugin (step 1018), and the method 1000 ends (step 1028). If, at step 1024, the ETS provides a negative indication and does not accept the suggestion to modify the bandwidth allocation and/or is unable to do so (e.g., no further bandwidth is available), the application plugin provides a suggestion to the hypervisor hosting the VM to reduce resources to the VM utilizing the particular class of I/O traffic through a resource de-allocation operation (step 1026); and the method 1000 ends (step 1028).

In some embodiments, additional information may be used in determining whether bandwidth should be re-allocated within the ETS of the switch 506. For example, a modification in number of storage volumes used by the VM or an amount of I/O and a frequency of detected pause frames may be utilized to facilitate the determination.

Consider two protocols (FCoE and iSCSI) are being configured on the switch 506, with following configuration in the network:

TABLE 2

| Protocol | Current BW allocation | No. of Volumes | New Volumes Count | New BW allocation suggestion by SDN Controller to ETS Switch |
|---|---|---|---|---|
| FCoE | 50% | 160 | 160 | 80% |
| iSCSI | 50% | 160 | 40 | 20% |

Table 2 indicates that, upon modifying a number of currently utilized volumes, a new bandwidth allocation threshold per class of I/O traffic associated with the volumes may be suggested/implemented. Thus, the following formula can be used to determine BW allocation based on change of volumes: New BW allocation=Volume for that particular protocol/(Total Volumes)×Total BW. This comprises one example of a heuristic approach to manage the formula. Similar such formulas can be used to determine the bandwidth allocations per class of I/O traffic, as would be appreciated by the skilled artisan.

Moreover, when bandwidth allocation is defined as 50%, for example, for each protocol, only one protocol (e.g., FCoE) is utilizing the network, and over a predetermined number of pause frames being generated for this protocol whereas usage for other protocols is minimal, a suggestion may be made by the SDN controller 552, for example, to increase the bandwidth allocation of the FCoE protocol such that when iSCSI I/O traffic increases on the network, the FCoE traffic is not generally affected.

TABLE 3

| Protocol | Current BW allocation | Amount of IO | No. of Pause Frames recorded in switch | New BW allocation suggestion |
|---|---|---|---|---|
| FCoE | 50% | High | High | 80% |
| iSCSI | 50% | Nil | 0 | 20% |

Accordingly, the bandwidth allocation for each protocol in the ETS may be adjusted (increased or decreased) according to a number of pause frames and an amount of I/O traffic associated with each protocol. As illustrated in the alteration of the bandwidth allocation in Table 3, when iSCSI I/O traffic rises, the number of pause frames would not rise substantially for FCoE I/O traffic. Thus, again, based on pause frames count and amount of I/O traffic per class, a formula can be determined to make the bandwidth re-allocation suggestion by the SDN controller 552 to the ETS of the switch 506.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for improving Input/Output (I/O) performance through bi-directional bandwidth feedback optimization, by a processor, comprising:
retrieving resource allocation information from a host by an application plugin;
retrieving bandwidth allocation information from a network switch using Enhanced Transmission Selection (ETS) by the application plugin;
performing a bandwidth optimization operation on at least one of the host and the network switch according to the resource allocation information received from the host and the bandwidth allocation information received from the network switch by the application plugin; and
determining, using the application plugin, whether the bandwidth allocation information of bandwidth allocated to a particular protocol of a plurality of protocols used by the network switch ETS is commensurate with respect to the resource allocation information of a set of resources currently used by the host which are dedicated to I/O traffic using the particular protocol.

2. The method of claim 1, further including:
when it is determined the bandwidth allocated to the particular protocol used by the network switch ETS is higher than required by the set of resources currently used by the host, reducing the bandwidth allocated to the particular protocol in the network switch EFS; and
when it is determined the bandwidth allocated to the particular protocol used by the network switch ETS is lower than required by the set of resources currently used by the host, increasing the bandwidth allocated to the particular protocol in the network switch EFS.

3. The method of claim 2, further including:
upon receiving a negative indication from the network switch ETS associated with decreasing the bandwidth allocated to the particular protocol, providing feedback, by the application plugin to the host, to allocate additional resources to the set of resources; and
upon receiving a negative indication from the network switch ETS associated with increasing the bandwidth allocated to the particular protocol, providing feedback, by the application plugin to the host, to de-allocate resources of the set of resources.

4. The method of claim 1, further including monitoring, using a monitoring agent, the I/O traffic used by the particular protocol; wherein:
when a peak bandwidth usage of the particular protocol is below an allocated threshold for a predetermined time period, the monitoring agent creates a warning to the network switch ETS to increase the bandwidth allocated to the particular protocol; and
when the peak bandwidth usage of the particular protocol is above the allocated threshold for the predetermined time period, the monitoring agent creates a warning to the network switch ETS to decrease the bandwidth allocated to the particular protocol.

5. The method of claim 1, further including adjusting the bandwidth allocated to the particular protocol in the network switch ETS according to a frequency of pause frames and amount of the I/O traffic detected.

6. The method of claim 1, wherein:
the host comprises a Virtual Machine (VM) and the resource allocation information is retrieved from a hypervisor executing the VM; and
the application plugin is executing within a Software Defined Networking (SDN) controller.

7. A system for improving Input/Output (I/O) performance through bi-directional bandwidth feedback optimization, comprising:
a processor executing instructions stored in a memory device; wherein the processor:
retrieves resource allocation information from a host by an application plugin;
retrieves bandwidth allocation information from a network switch using Enhanced Transmission Selection (ETS) by the application plugin;
performs a bandwidth optimization operation on at least one of the host and the network switch according to the resource allocation information received from the host and the bandwidth allocation information received from the network switch by the application plugin; and determines, using the application plugin, whether the bandwidth allocation information of bandwidth allocated to a particular protocol of a plurality of protocols used by the network switch ETS is commensurate with respect to the resource allocation information of a set of resources currently used by the host which are dedicated to I/O traffic using the particular protocol.

8. The system of claim 7, wherein the processor:

when it is determined the bandwidth allocated to the particular protocol used by the network switch ETS is higher than required by the set of resources currently used by the host, reduces the bandwidth allocated to the particular protocol in the network switch EFS; and when it is determined the bandwidth allocated to the particular protocol used by the network switch ETS is lower than required by the set of resources currently used by the host, increases the bandwidth allocated to the particular protocol in the network switch EFS.

9. The system of claim 8, wherein the processor:

upon receiving a negative indication from the network switch ETS associated with decreasing the bandwidth allocated to the particular protocol, provides feedback, by the application plugin to the host, to allocate additional resources to the set of resources; and upon receiving a negative indication from the network switch ETS associated with increasing the bandwidth allocated to the particular protocol, provides feedback, by the application plugin to the host, to de-allocate resources of the set of resources.

10. The system of claim 7, wherein the processor monitors, using a monitoring agent, the I/O traffic used by the particular protocol; wherein:

when a peak bandwidth usage of the particular protocol is below an allocated threshold for a predetermined time period, the monitoring agent creates a warning to the network switch ETS to increase the bandwidth allocated to the particular protocol; and when the peak bandwidth usage of the particular protocol is above the allocated threshold for the predetermined time period, the monitoring agent creates a warning to the network switch ETS to decrease the bandwidth allocated to the particular protocol.

11. The system of claim 7, wherein the processor adjusts the bandwidth allocated to the particular protocol in the network switch ETS according to a frequency of pause frames and amount of the I/O traffic detected.

12. The system of claim 7, wherein:

the host comprises a Virtual Machine (VM) and the resource allocation information is retrieved from a hypervisor executing the VM; and the application plugin is executing within a Software Defined Networking (SDN) controller.

13. A computer program product for improving Input/Output (I/O) performance through bi-directional bandwidth feedback optimization, by a processor, the computer program product embodied on a non-transitory computer-readable storage medium having computer-readable program code portions stored therein, the computer-readable program code portions comprising:

an executable portion that retrieves resource allocation information from a host by an application plugin;

an executable portion that retrieves bandwidth allocation information from a network switch using Enhanced Transmission Selection (ETS) by the application plugin;

an executable portion that performs a bandwidth optimization operation on at least one of the host and the network switch according to the resource allocation information received from the host and the bandwidth allocation information received from the network switch by the application plugin; and an executable portion that determines, using the application plugin, whether the bandwidth allocation information of bandwidth allocated to a particular protocol of a plurality of protocols used by the network switch ETS is commensurate with respect to the resource allocation information of a set of resources currently used by the host which are dedicated to I/O traffic using the particular protocol.

14. The computer program product of claim 13, further including an executable portion that:

when it is determined the bandwidth allocated to the particular protocol used by the network switch ETS is higher than required by the set of resources currently used by the host, reduces the bandwidth allocated to the particular protocol in the network switch EFS; and when it is determined the bandwidth allocated to the particular protocol used by the network switch ETS is lower than required by the set of resources currently used by the host, increases the bandwidth allocated to the particular protocol in the network switch EFS.

15. The computer program product of claim 14, further including an executable portion that:

upon receiving a negative indication from the network switch ETS associated with decreasing the bandwidth allocated to the particular protocol, provides feedback, by the application plugin to the host, to allocate additional resources to the set of resources; and upon receiving a negative indication from the network switch ETS associated with increasing the bandwidth allocated to the particular protocol, provides feedback, by the application plugin to the host, to de-allocate resources of the set of resources.

16. The computer program product of claim 13, further including an executable portion that monitors, using a monitoring agent, the I/O traffic used by the particular protocol; wherein:

when a peak bandwidth usage of the particular protocol is below an allocated threshold for a predetermined time period, the monitoring agent creates a warning to the network switch ETS to increase the bandwidth allocated to the particular protocol; and when the peak bandwidth usage of the particular protocol is above the allocated threshold for the predetermined time period, the monitoring agent creates a warning to the network switch ETS to decrease the bandwidth allocated to the particular protocol.

17. The computer program product of claim 13, further including an executable portion that adjusts the bandwidth allocated to the particular protocol in the network switch ETS according to a frequency of pause frames and amount of the I/O traffic detected.

18. The computer program product of claim 13, wherein:

the host comprises a Virtual Machine (VM) and the resource allocation information is retrieved from a hypervisor executing the VM; and the application plugin is executing within a Software Defined Networking (SDN) controller.

\* \* \* \* \*